United States Patent [19]
Bard et al.

[11] Patent Number: 5,170,277
[45] Date of Patent: Dec. 8, 1992

[54] PIEZOELECTRIC BEAM DEFLECTOR

[75] Inventors: Dimon Bard; Boris Metlitsky, both of Stony Brook; Jerome Swartz, Old Field; Joseph Katz, Stony Brook, all of N.Y.

[73] Assignee: Symbol Technologies, Inc., Bohemia, N.Y.

[21] Appl. No.: 766,315

[22] Filed: Sep. 27, 1991

Related U.S. Application Data

[63] Continuation-in-part of Ser. No. 07/699,417, May 13, 1991, which is a continuation-in-part of Ser. No. 07/193,265, May 11, 1988, Pat. No. 5,144,120.

[51] Int. Cl.$^5$ .............................................. G02B 26/08
[52] U.S. Cl. ................................. 359/210; 359/202; 359/223; 235/462; 235/472; 250/566
[58] Field of Search .............. 359/813, 210, 211, 209, 359/223, 224, 201, 202, 694, 696, 795; 235/462, 472, 467, 488, 470; 250/560, 566

[56] References Cited

U.S. PATENT DOCUMENTS

| | | |
|---|---|---|
| 1,438,974 | 12/1922 | Wente . |
| 1,980,888 | 11/1931 | Thomas . |
| 2,920,529 | 1/1960 | Blythe . |
| 3,508,814 | 4/1970 | Aas . |
| 3,532,408 | 10/1970 | Dostal . |
| 3,544,201 | 12/1970 | Fowler et al. . |
| 3,612,642 | 10/1971 | Dostal .................. 359/214 |
| 3,614,677 | 10/1971 | Wilfinger ............... 333/71 |
| 3,700,304 | 10/1972 | Dostal et al. ............ 359/214 |
| 3,758,199 | 9/1973 | Thaxter .................. 359/224 |
| 3,794,410 | 2/1974 | Elliott .................... 359/224 |
| 3,902,783 | 9/1975 | Bodlaj .................... 359/221 |
| 3,981,566 | 9/1976 | Frank et al. ............ 359/224 |
| 3,998,092 | 12/1976 | Maccabee ............... 73/113 |
| 4,025,203 | 5/1977 | Lee ........................ 359/224 |
| 4,074,312 | 2/1978 | van Rosmalen ......... 359/210 |
| 4,123,166 | 10/1978 | Botcherby et al. ...... 359/210 |
| 4,170,397 | 10/1979 | Botcherby et al. ...... 359/210 |
| 4,251,798 | 2/1981 | Swartz et al. ........... 235/462 |
| 4,436,364 | 3/1984 | Lauer et al. . |
| 4,496,831 | 1/1985 | Swartz et al. ........... 235/472 |
| 4,577,131 | 3/1986 | Soobitsky ............... 310/328 |
| 4,708,420 | 11/1987 | Liddiard ................. 359/199 |
| 4,758,717 | 7/1988 | Shepard et al. ......... 235/472 |
| 4,775,815 | 10/1988 | Heinz ..................... 310/328 |
| 4,778,233 | 10/1988 | Christenson et al. .... 359/214 |
| 4,784,448 | 11/1988 | Sepp et al. .............. 359/224 |
| 4,818,886 | 4/1989 | Drucker ................. 250/566 |
| 4,838,632 | 6/1989 | Manian .................. 359/221 |
| 4,871,904 | 10/1989 | Metlitsky et al. ....... 235/467 |
| 4,902,083 | 2/1990 | Wells ..................... 359/214 |
| 4,939,356 | 7/1990 | Rando et al. ........... 235/467 |
| 5,015,831 | 5/1991 | Eastman et al. ........ 235/462 |

OTHER PUBLICATIONS

Wakamiya, "New Two Dimensional Piezoelectric Actuator", *Transducers* 87, pp. 865-868.

Toda, "Design of Piezoelectric Polymer Motional Devices with Various Structures", *Transactions of the IECE of Japan*, vol. E 61, No. 7, Jul. 1978.

Lee, "Piezoelectric Bimorph Optical Beam Scanners: Analysis and Construction", *Applied Optics*, vol. 18, No. 4, Feb. 15, 1979.

*Primary Examiner*—Loha Ben

[57] ABSTRACT

Several embodiments are disclosed of bar code readers in which one or more piezoelectric bimorph elements are utilized as a drive element in the optical system thereof. In different embodiments, the piezoelectric bimorph element is utilized in the scanning function of the bar code reader optical system, or in a variable focus zooming function of the optical system. The bar code readers are provided with improved decoding reliability, speed and orientation freedom, with regular or high density, one or two dimensional bar codes, by using multiple beam symbol crossings, created by using one or more piezoelectric bimorph elements. In different disclosed embodiments, one or more cantilever mounted piezoelectric bimorph elements support a scanning mirror, or a focusing lens, or a laser diode, or a laser diode and limiting aperture, for movement at the free ends of the bimorph elements to produce a scanning of the bar code reader optical system. Several disclosed embodiments of the subject invention provide a beam deflector for a bar code reader optical system having a variable focus zoom lens system in which one or more cantilever mounted piezoelectric bimorph elements control the variable focus zoom lens system.

40 Claims, 4 Drawing Sheets

5,170,277

PIEZOELECTRIC BEAM DEFLECTOR1

CROSS REFERENCE TO RELATED APPLICATIONS

This application is a continuation-in-part of pending application Ser. No. 07/699,417 filed on May 13, 1991, which is in turn a continuation-in-part of application Ser. No. 07/193,265 filed May 11, 1988, now U.S. Pat. No. 3,144,120, both of which are herein entirely incorporated by reference.

BACKGROUND OF THE INVENTION

1. Field of the Invention

The present invention relates generally to a piezoelectric beam deflector useful in bar code reader optical systems, both in scanning optical systems and also in zoom optical systems.

More particularly, the subject invention pertains to simple and reliable piezoelectric beam deflectors which are useful in scanning and reading high and low density one and two dimensional bar code patterns.

2. Discussion of the Prior Art

The increased use of bar code symbols to identify products, particularly in retail businesses, has resulted in the development of various bar code reading systems. Many users of bar code readers require portable hand-held scanners which place a premium on small size, lightweight and low power consumption requirements for the devices. One such system is a laser scanning bar code reading system as described in U.S. Pat. No. 4,496,831, commonly assigned to the same assignee as the present patent application.

The laser scanning system disclosed in U.S. Pat. No. 4,496,831 includes a portable hand-held scanning head which may be embodied in various shapes, but preferably has a gun shaped housing made of lightweight plastic. A handle and barrel portion are provided to house the various components of the scanning system therein. Within the barrel portion are mounted a miniature light source, a miniature optic train including focusing lenses and a scanning system for directing light from the light source across a bar code symbol, and miniature sensing means for detecting reflected light from the bar code symbol being scanned.

The miniature light source can comprise a laser tube such as a coaxial helium neon laser tube, or an LED, or preferably a semiconductor laser diode which is considerably smaller and lighter than a laser tube, thus reducing the required size and weight of the scanning head and making the scanning head easier to handle and more maneuverable. Light generated by the light source passes through the optic train which directs the beam onto the scanning system which is mounted within the barrel portion of the scanning head. The scanning system sweeps the laser beam across the bar code symbol and comprises at least one scanning stepping motor or resonating or vibrating bar or scanner for sweeping the beam lengthwise across the symbol, and may comprise two motors wherein the second motor sweeps the beam widthwise across the symbol. Light reflecting mirrors are mounted on the motor shaft or shafts to direct the beam through the outlet port to the symbol.

Currently used beam deflection apparatus uses a motor with different types of mirrors (including a polygon shaped mirror) mounted on or integrated with a motor shaft. The present invention eliminates a motor with its associated problems, like high cost, occupied space, heat dissipation, power consumption, reliability issues, etc., and several embodiments eliminate a mirror (such as a polygon shaped mirror) as a separate member of the beam deflector.

A sensing circuit then detects and processes the light reflected from the symbol and generally comprises a photodetector element such as a semiconductor photodiode. The user positions the handheld unit so the scan pattern traverses the symbol to be read, and the photodetector element produces serial electrical signals to be processed for identifying the bar code. A signal processing circuit for a bar code produces a signal which is directed to a bar pattern decoder circuit for decoding the bar pattern.

The reader unit can have a movable trigger employed to allow the user to activate the light beam and detector circuitry when pointed at the symbol to be read, thereby conserving battery life if the unit is self-powered. The lightweight plastic housing contains the laser light source, the detector, the optics, signal processing circuitry, a CPU and a battery. The reader is designed to be aimed at a bar code symbol by the user from a position where the reader is spaced from the symbol, i.e. not touching the symbol or moving across the symbol. Typically, this type of hand-held bar code reader is specified to operate in the range of perhaps several inches. Alternatively, the scanning can be performed automatically without any human interface or intervention.

SUMMARY OF THE INVENTION

Accordingly, it is a primary object of the present invention to provide a bar code reader or scanner in which a piezoelectric bimorph element is utilized as a drive element in the optical system thereof. The piezoelectric bimorph element can be utilized in the scanning function of the bar code reader optical system, or in a variable focus zooming function of the optical system.

A further object of the subject invention is the provision of a bar code reader with improved decoding reliability, speed and orientation freedom, for regular and high density, one and two dimensional bar codes, by using multiple beam symbol crossings, created by using a single or multi-mirror system mounted on or connected by flexible or rigid connectors to piezoelement(s). The mirror can be a separate element, or can be a mirrored surface on the piezoelement(s).

The current trend in operation of scanning elements is towards operation at higher frequencies (e.g. to read 2D codes) as well as improved efficiency in reading 1D codes. Both piezoelectric actuators and moving coil actuators can operate at high frequencies ranging from hundreds of hertz to tens of kilohertz, but have a technical disadvantage of a very small magnitude of mechanical displacement. Electrostrictive methods are preferable since no moving parts are involved. One possible solution is a phenomena known as stationary waves. When the piezoelectric ceramics are adhered to an elastic body and an AC voltage is applied to the element, the assembly moves up and down repeatedly at the same position. If the elastic body is coated with a reflective material or a mirror is mounted on supports attached to the elastic body and separated by a distance equal to ½ period of the wave, then the laser beam can be reflected with an acceptable large scanning angle. Larger displacements are also possible when the frequency of the drive signal equals the mechanical resonance frequency of the piezoelement. Some piezoelectric materials have resonant frequencies in the 500–5000 Hz range which is a range of interest. Other alternatives include PVDF (piezoelectric film) and ceramic bimorph based actuators and flexible mirrors, with an arrangement to amplify the movement of the piezoelements.

In accordance with the teachings herein, the present invention provides a beam deflector for a bar code reader optical system having a focusing lens with a relatively short focal length. A piezoelectric bimorph element mounts the focusing lens for movement substantially perpendicular to its optical axis to produce a scanning of the optical system in a direction perpendicular to the optical axis. In several disclosed embodiments, the piezoelectric bimorph element is cantilever mounted, and the focusing lens is mounted at the free end of the piezoelectric bimorph element. In one disclosed embodiment, a second cantilever mounted bimorph element has its free end secured to the focusing lens also, and the first and second bimorphs are driven in-phase to produce a scanning of the bar code reader optical system in a direction perpendicular to its optical axis.

In several disclosed embodiments of the present invention, the bar code reader is implemented in a portable, hand-held instrument, and the bar code scanner optical system includes a laser diode spaced along the optical axis of the optical system.

Several disclosed embodiments of the subject invention provide a beam deflector for a bar code reader optical system which includes a focusing lens system with a relatively short focal length, a laser diode, and a limiting aperture, all spaced along the optical axis of the optical system. A piezoelectric bimorph element mounts the laser diode for movement substantially perpendicular to the optical axis of the bar code reader optical system to produce a scanning in a direction perpendicular to the optical axis. The piezoelectric bimorph element is preferably cantilever mounted, and the focusing lens is mounted at the free end of the piezoelectric bimorph element. In several embodiments, the limiting aperture is also mounted on the piezoelectric bimorph element for movement along with the laser diode, and the focusing lens system includes a positive lens and a negative lens, which lens combination increases the scanning angle of deflection.

In one disclosed embodiment, a second piezoelectric bimorph element is cantilever mounted on the first piezoelectric bimorph element, and the laser diode and limiting aperture are mounted at the free end of the second piezoelectric bimorph element, such that the laser diode and limiting aperture are driven in combined x and y scanning motions by the combined motions of the first and second piezoelectric bimorph elements.

Several disclosed embodiments of the present invention provide a beam deflector for a bar code reader optical system which includes a focusing lens with a relatively short focal length. A first piezoelectric bimorph element is cantilever mounted for scanning movement along a first axis, and a second piezoelectric bimorph element is cantilever mounted on the free end of the first piezoelectric bimorph element for scanning movement along a second axis substantially perpendicular to the first axis. A scanning mirror or a mirrored surface is mounted on the free end of the second piezoelectric bimorph element, such that the scanning mirror is driven in combined x and y scanning motions by the combined motions of the first and second piezoelectric bimorph elements.

Another disclosed embodiment of the subject invention provides a beam deflector for a bar code scanner optical system which includes a focusing lens with a relatively short focal length. A first cantilever mounted piezoelectric bimorph element supports a first mirror at its free end which is positioned along the optical axis for scanning movement along a first axis. A second cantilever mounted piezoelectric bimorph element is mounted independently of the first piezoelectric bimorph element and supports a second mirror at its free end which is positioned along the optical axis for scanning movement along a second axis substantially perpendicular to the first axis. The arrangement is such that the scanning beam is deflected in combined x and y scanning motions by the combined motions of the first and second mirrors.

Several disclosed embodiments of the present invention provide a beam deflector for a bar code scanner optical system which includes a focusing lens with a relatively short focal length. A first piezoelectric bimorph element is cantilever mounted for scanning movement along a first axis, and a second piezoelectric bimorph element is cantilever mounted for scanning movement along a second axis substantially perpendicular to the first axis. A scanning mirror is coupled to and driven by the first and second piezoelectric bimorph elements, such that the scanning mirror is driven in combined x and y scanning motions by the combined motions of the first and second piezoelectric bimorph elements. In one embodiment, the scanning mirror means is coupled directly to the first piezoelectric bimorph element, and is coupled by a thin bar to the second piezoelectric bimorph element. In a second embodiment, the scanning mirror is coupled to the first piezoelectric bimorph element by a first thin bar, and is coupled to the second piezoelectric bimorph element by a second thin bar.

One disclosed embodiment of the present invention provides a beam deflector for a bar code scanner optical system which includes a focusing lens with a relatively short focal length. A cantilever mounted base holder is driven by a permanent magnet and coil for scanning movement of the base holder along a first axis. A piezoelectric bimorph element is cantilever mounted on the base holder and supports a scanning mirror at its free end for scanning movement along a second axis substantially perpendicular to the first axis. In this embodiment, the piezoelectric bimorph element is cantilever mounted by a holder element positioned substantially midlength of the piezoelectric bimorph element.

Several disclosed embodiments of the present invention provide a bar code reader in which a piezoelectric bimorph element is used to drive a zoom variable focus optical system therein. One embodiment thereof provides a beam deflector for a bar code scanner optical system having a focusing lens with a relatively short focal length. A first cantilever mounted piezoelectric bimorph element supports the focusing lens on one side, while a second cantilever mounted piezoelectric bimorph element supports an opposite side of the focusing lens. In operation, the first and second piezoelectric bimorph elements are driven out-of-phase to produce a focusing movement of the focusing lens along its optical axis to produce a zoomed focusing of the bar code scanner optical system. A second disclosed embodiment provides a beam deflector for a bar code reader optical system which includes a focusing lens with a relatively short focal length, a laser diode, and an adjustable limiting aperture, all spaced along the optical axis of the optical system. A piezoelectric bimorph element drives the adjustable limiting aperture to different aperture diameters, to produce a zoomed focusing of the bar code scanner optical system. The piezoelectric bimorph element is preferably cantilever mounted, and the adjusting limiting aperture is mounted at the free end of the cantilever mounted piezoelectric bimorph element.

BRIEF DESCRIPTION OF THE DRAWINGS

The foregoing objects and advantages of the present invention for a piezoelectric beam deflector may be more readily understood by one skilled in the art with reference being had to the following detailed description of several preferred embodiments thereof, taken in conjunction with the accompanying drawings wherein like elements are designated by identical reference numerals throughout the several views, and in which.

DETAILED DESCRIPTION OF THE DRAWINGS

Figure 1:
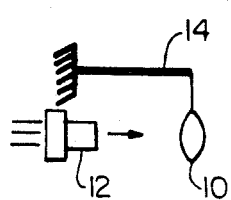
FIG. 1 illustrates a schematic arrangement of a scanning beam deflector wherein a short focal length focusing lens is mounted to and oscillated by a piezoelectric bimorph.

Referring to the drawings in detail, FIG. 1 illustrates a schematic arrangement of a scanning beam deflector for a mirrorless bar code scanner wherein a short focal length lens 10 is positioned in front of a light source such as a laser diode 12, and is mounted to and oscillated by a piezoelectric bimorph 14.

Piezoelectric bimorph structures are well known in the art and can, for example, comprise two thin layers of lead zirconate titanate (PZT), or polyvinylidene fluoride (PVDF) film, bonded together with a conductive medium. The upper and lower surfaces (excluding the edges) of the structure are coated with a conductive material. The upper piezoelectric layer is poled so that it expands longitudinally, while the lower layer contracts with an applied electric field. When a voltage is applied thereto by making contact to the upper and lower conductors, the device bends. If the voltage is reversed, the bimorph bends in the opposite direction. The piezoelectric bimorph element can also be formed of piezoceramic or piezofilm, or can be of any suitable construction.

Figure 2:
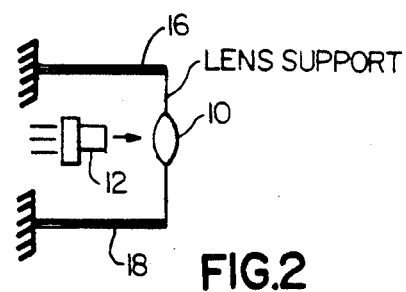
FIG. 2 is a schematic arrangement of a scanning beam deflector wherein a short focal length focusing lens is mounted to and oscillated by a pair of piezoelectric bimorphs which are driven in an in-phase manner.

FIG. 2 is a schematic arrangement of a scanning beam deflector wherein a short focal length focusing lens 10 is positioned in front of a light source such as a laser diode 12, and is mounted to and oscillated by a pair of piezoelectric bimorphs 16, 18 which are driven in an in-phase manner, which results in a more stable mounting arrangement for the focusing lens.

Lens focusing systems in presently available bar code scanners use a lens with a relatively short focal length. As a result, a very short lateral movement of the laser diode therein causes a relatively large change in the angle of beam deflection after the focusing lens, as illustrated by FIGS. 3–6.

Figure 3:
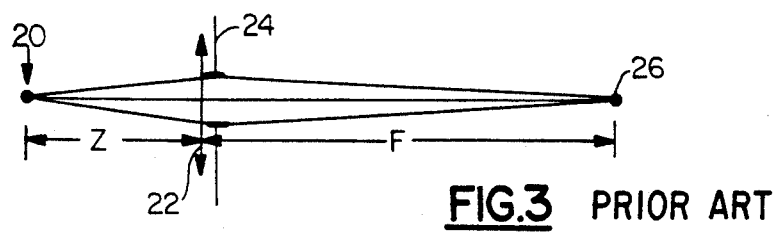
FIG. 3 illustrates an optical schematic of a conventional prior art bar code focusing optical system.

FIG. 3 illustrates an optical schematic of a conventional prior art bar code focusing optical system having an illuminating laser diode 20, a short focal length lens 22, and a limiting aperture 24, which produces a beam waist focused at 26.

Figure 4:
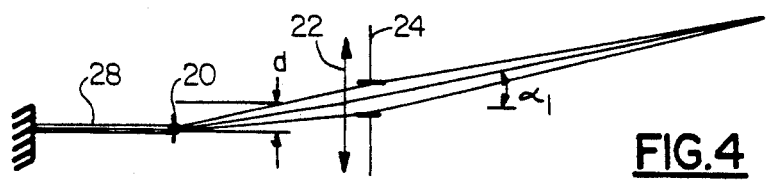
FIG. 4 depicts a bar code focusing optical system similar to FIG. 3 wherein the laser diode is oscillated by a piezoelectric bimorph to cause scanning of the focused beam generated thereby.

FIG. 4 depicts a bar code focusing optical system of the type illustrated in FIG. 3 wherein the laser diode is oscillated by a piezoelectric bimorph 28 to cause scanning of the focused beam generated thereby. In the arrangement of FIG. 4, the laser diode 20 is shifted by d[mm], which results in an angle of deflection $\alpha_1 = d/Z$, where Z is the distance between the laser diode 20 and the lens 22.

Figure 5:
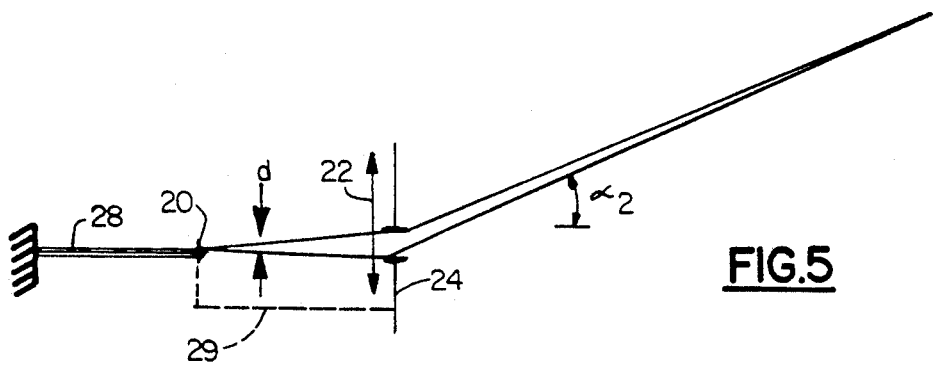
FIG. 5 illustrates a bar code focusing optical system similar to FIG. 3 wherein either the lens or the laser diode and aperture is oscillated by a piezoelectric bimorph to result in scanning of the focused beam generated thereby.

FIG. 5 illustrates a bar code focusing optical system of the type illustrated in FIG. 3 wherein either the lens 22, or the assembly 29 of the laser diode 20 and aperture 24, is oscillated by a piezoelectric bimorph 29 to result in scanning of the focused beam generated thereby. In the arrangement of FIG. 5, either the lens 22 is moved by d[mm], or an assembly 29 of the laser diode 20 and the aperture 24 are moved by d[mm], which results in an angle of deflection $\alpha_2 = d/F$, wherein F is the focal length of the lens.

Usually $F > Z$ and as a result $\alpha_2 > \alpha_1$. Other than that, the optical arrangement of FIG. 5 is preferred from the point of view of power transmission since in this case the laser diode 20 looks directly into aperture 24.

The achievable angles of deflection with an optical system for a presently available bar code scanner are as follows. Working with a lens with $F = 10$ mm for $d = 1$ mm $=> \alpha_2 = 5.7°$.

Figure 6:
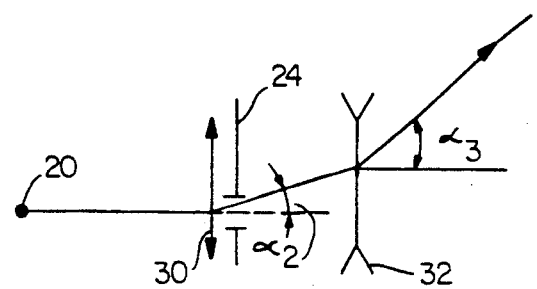
FIG. 6 illustrates a bar code focusing optical system using a combination of a positive lens and a negative lens for both beam focusing and beam deflection and scanning.
Figure 7:
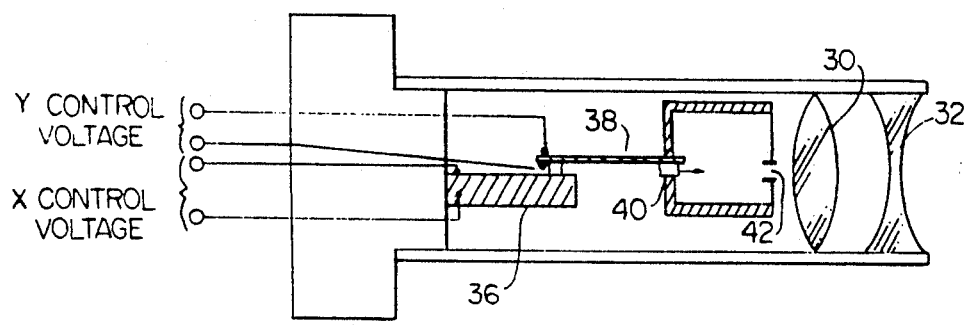
FIG. 7 illustrates a bar code scanning optical system wherein a pair of piezoelectric bimorphs, one for x deflection and the second for y deflection, drive a laser diode and aperture for combined x and y deflection of the focused beam.

If this angle is not sufficiently large or if it is difficult to achieve a 1 mm lateral shift of the laser diode, a deflection angle enhancer as shown in FIGS. 6 and 7 is possible. FIGS. 6 and 7 illustrate a bar code focusing optical system using a combination of a positive lens 30 and a negative lens 32 for both beam focusing and beam deflection and scanning. With this system, the results of an analysis indicate that it is relatively easy to build a compact optical system with an angle of deflection $\alpha_3 = 10°$.

The situations shown hold true for a two dimensional case also. FIG. 7 illustrates a bar code scanning optical system similar in concept to that of FIG. 6 wherein a pair of piezoelectric bimorphs, a first cantilever mounted bimorph 36 for x deflection and a second cantilever mounted bimorph 38, mounted on the free end of the first element 36, for y deflection, drive a laser diode 40 and an aperture 42 for combined x and y deflection of the focused beam. The bar code focusing optical system uses both a positive lens 30 and a negative lens 32 for beam focusing and also for beam deflection and scanning.

Piezofilm (such as polyvinylidene fluoride (PVDF) film) based end-clamped bimorph elements can be used as beam benders in several of the embodiments herein. Preliminary calculations show that a lateral shift of $\pm 1$ mm can be achieved by applying only $\pm 15$ volts to such a beam bender.

Figure 8:
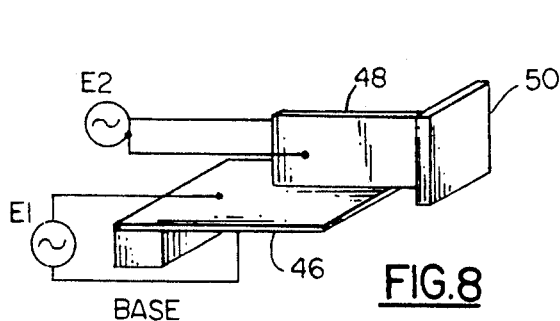
FIG. 8 depicts a bar code scanning optical system wherein a pair of piezoelectric bimorphs, one for x deflection and the second bimorph, which is mounted on the first bimorph, for y deflection, drive a mirror scanner for combined x and y deflections of the scanned beam.

FIG. 8 depicts a bar code scanning optical system having a pair of sequentially mounted piezoelectric bimorphs, a first bimorph 46 for y deflection and a second bimorph 48, mounted on the first bimorph 46, for x deflection, which drives a scanning mirror 50 for combined x and y deflections of the scanned beam. In this arrangement, the scanning mirror can be a separate mirror element or a mirror-like reflective material coated on the piezoelectric bimorph element. In the embodiment of FIG. 8, the entire first piezoelement assembly is mounted on the second piezoelement assembly, which produces a two dimensional scan. The light beam incident on the surface of the mirror 50 is deflected with a frequency and angle dependent upon the characteristics of the piezoelements and the parameters of the drive signals.

Figure 9:
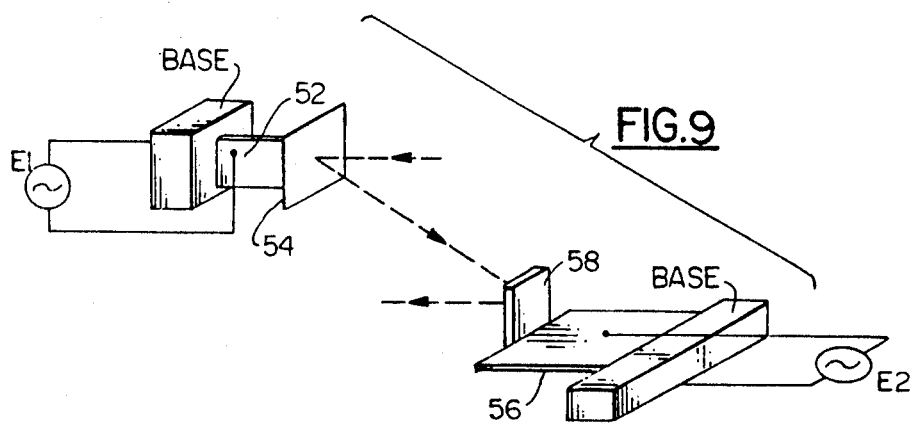
FIG. 9 depicts a bar code scanning optical system wherein a pair of independently mounted piezoelectric bimorphs, one for driving a first mirror for x deflection and the second for driving a second mirror for y deflection, produce combined x and y deflections of the scanned beam.

FIG. 9 depicts a bar code scanning optical system having a pair of independently mounted piezoelectric bimorphs, a first 52 for driving a first mirror 54 for x deflection and a second 56 for driving a second mirror 58 for y deflection, thereby producing combined x and y deflections of the scanned beam.

Figure 10:
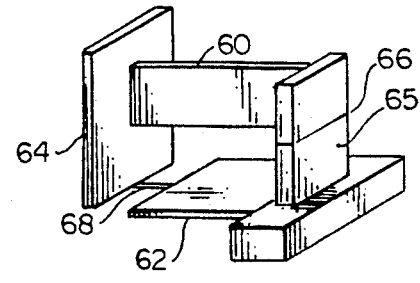
FIGS. 10 and 11 depict similar bar code scanning optical arrangements wherein first and second piezoelectric bimorphs are flexibly attached to different points on a scanning mirror to create a two dimensional scanning pattern.
Figure 11:
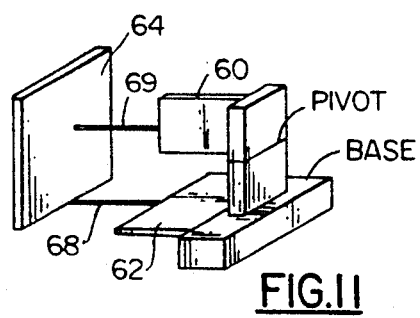

In some alternative embodiments, the two piezoelements can be flexibly attached to different areas of a mirror to create a two dimensional scan pattern. FIGS. 10 and 11 depict bar code scanning optical arrangements wherein first and second piezoelectric bimorphs 60, 62 are flexibly attached to different points on a scanning mirror 64 to create a two dimensional scanning pattern. In FIG. 10, a common base 65 having a pivot 66 mounts the first bimorph 60, attached to the center of the mirror 64, for x deflection, and also mounts the second bimorph 62, attached by a bar 68 to one end of the mirror 64, for y deflection. The arrangement of FIG. 11 is similar to that of FIG. 10, and adds a bar 69 between the first bimorph 60 and the mirror to provide additional flexibility for the y scanning motion.

Other types of beam benders, other than piezoelements, can also be utilized in some embodiments of the present invention, such as inexpensive and low power consumption electromagnetic elements like voice-coil drives.

Figure 12:
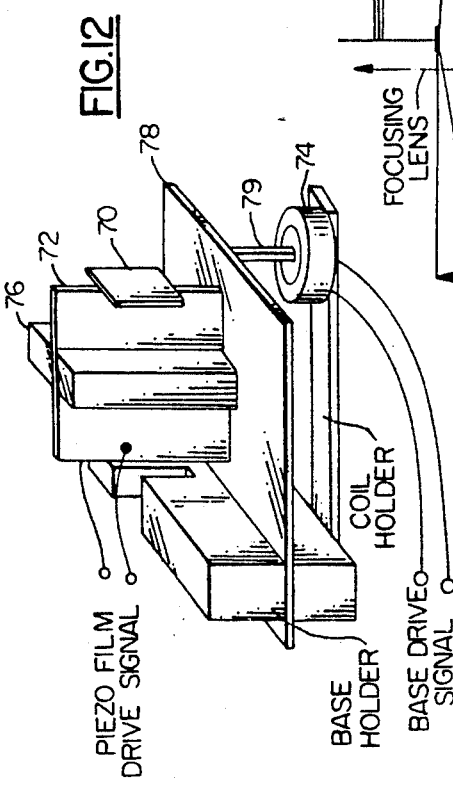
FIG. 12 illustrates a bar code scanning optical system having a single scanning mirror which is driven to scan along one axis by a piezoelectric bimorph and is driven to scan along a second axis by a magnetic drive coil.

FIG. 12 illustrates a bar code scanning optical system having a single scanning mirror 70 which is driven to scan along the x axis by a piezoelectric bimorph 72 and is driven to scan along a second axis by a magnetic drive coil 74. The piezoelectric bimorph 72, with a mirror 70 or mirror-like material, is supported on a base holder 76, which is mounted on a flexible base 78 (polyester film or metal). A permanent magnet 79 is attached to the base 78, and the coil 74 is mounted therebelow. When electrical signals are applied, the piezoelement 72 provides a scanning motion in a first x direction, while interaction between the magnet 76 and the magnetic coil 44 causes a scanning motion in a perpendicular y direction.

A second practical application for piezoelectric or electromagnetic drives in laser diode bar code scanners is in zoom optical systems.

Figure 13:
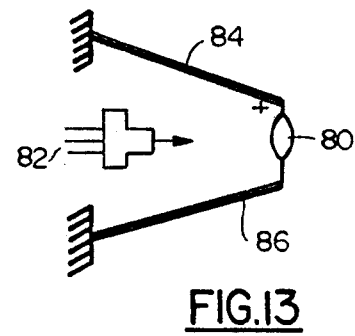
FIG. 13 illustrates a bar code scanning zoom optical system wherein a focusing lens is displaced along its optical axis relative to a laser diode by a pair of piezoelectric bimorphs driven in an anti-phase manner.

FIG. 13 illustrates a bar code scanning zoom optical system wherein a focusing lens 80 is displaced along its optical axis relative to a laser diode 82 by a pair of piezoelectric bimorphs 84, 86 driven in an anti-phase manner.

Other embodiments with zoom bar code scanners are based upon the fact that current laser diode bar code scanners use an optical focusing system with a very low Fresnel number $N = a^2 / \lambda Z$ where a is radius of aperture;
$\lambda$ is wavelength; and
Z is focusing distance.

As a result, the beam waist is shifted from a position predicted by classical optics toward the lens in dependence upon the aperture size. A qualitative explanation of this effect is illustrated by FIGS. 14 and 15.

Figure 14:
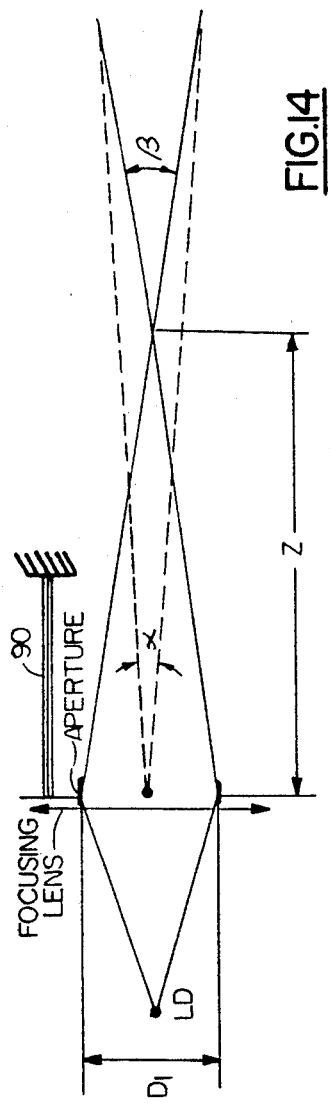
FIGS. 14 and 15 illustrate the effects of changing the optical beam waist diameter by a variable aperture in a bar code scanning zoom optical system, with FIG. 14 illustrating a large optical beam waist diameter and FIG. 15 depicting a small optical beam waist diameter.
Figure 15:
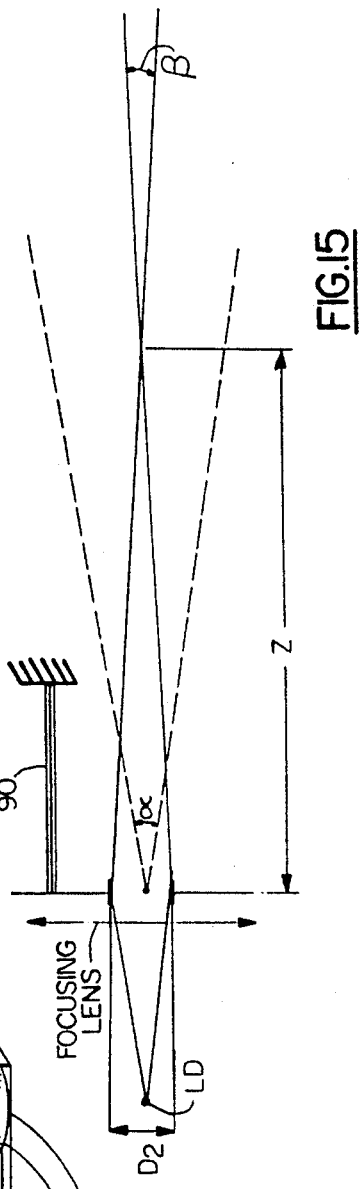

FIGS. 14 and 15 illustrate the effects of different aperture sizes upon the optical beam waist in a bar code scanning zoom optical system, with FIG. 14 illustrating a large aperture size D1 and FIG. 15 depicting a small aperture size D2. In FIG. 14 the situation is shown with $N >> 1$. In this situation, the angle $\beta$ of cone of geometric rays (solid line) is much greater than the angle of cone of diffraction $\alpha$. This situation is common to regular photographic systems.

The image of the laser diode is located at a distance Z from the lens. The geometrical angle $\beta = D/Z$. The diffraction angle $\alpha = k \lambda/D$, wherein k is a proportionality constant, and $\lambda$ is a wavelength.

The beam diameter at any distance from the lens can be approximately represented by the sum of two diameters, geometrical and diffraction. When $D_1$ is large (case of $N >> 1$), the diffraction angle is small and the beam waist is located at a distance Z as predicted by classical optics. But when D is small ($D_2$ in FIG. 15) and $\alpha = \beta$ which corresponds to the situation N = 1, the diffraction cone starts to contribute to the overall beam diameter and the beam waist is shifted toward the lens.

Therefore, a piezoelectric bimorph 90 can be utilized to control the aperture size, a change of which causes a shift of the beam waist. It can be shown that with a presently existing bar code scanning optical system, the waist can be moved within 7–8" while maintaining the waist size about 10 mils.

Figure 16:
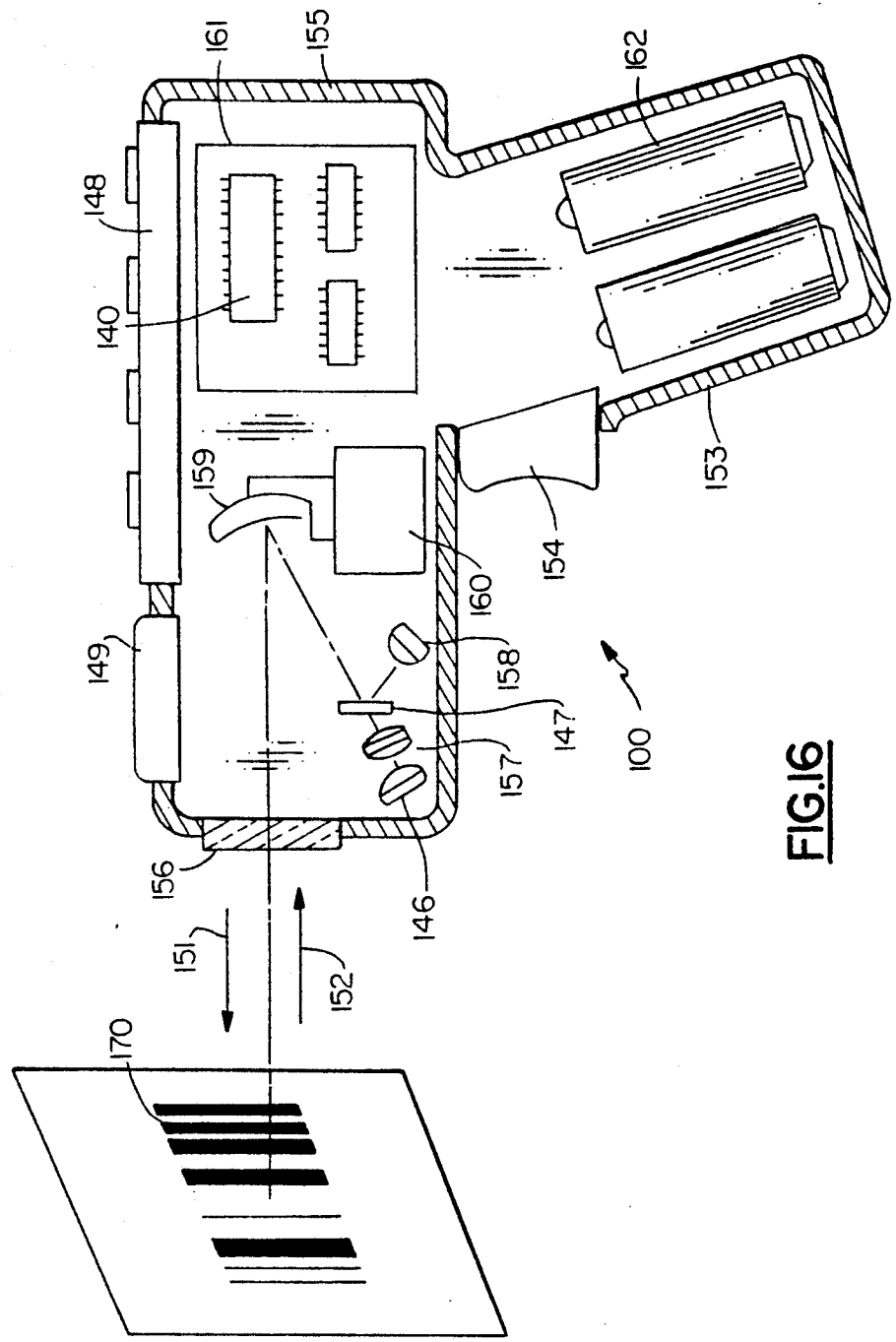
FIG. 16 illustrates a highly simplified embodiment of one type of bar code reader which can be utilized in association with the optical scanner with extended depth of focus of the present invention.

FIG. 16 illustrates a highly simplified embodiment of one type of bar code reader that may be modified to utilize the piezoelectric beam deflector of the present invention. A reader 100 may be implemented in a hand-held scanner, as illustrated, or a desk-top workstation or stationary scanner. In a preferred embodiment, the arrangement is implemented in a housing 155 that includes an exit port 156 through which an outgoing laser light beam 151 is directed to impinge on, and to be scanned across, symbols 170 located exteriorly of the housing.

The hand-held device of FIG. 16 is generally of the style disclosed in U.S. Pat. No. 4,760,248 issued to Swartz et al., or in U.S. Pat. No. 4,896,026 assigned to Symbol Technologies, Inc., and also similar to the configuration of a bar code reader commercially available as part number LS 8100 or LS 2000 from Symbol Technologies, Inc. Alternatively, or in addition, features of U.S. Pat. No. 4,387,297 issued to Swartz et al. or U.S. Pat. No. 4,409,470 issued to Shepard et al., both such patents assigned to Symbol Technologies, Inc., may be employed in constructing the bar code reader unit of FIG. 16. These U.S. Pat. Nos. 4,760,248, 4,896,026 and 4,409,470 are incorporated herein by reference, but the general design of such devices will be briefly described here for reference.

Referring to FIG. 16 in more detail, an outgoing light beam 151 is generated in the reader 100, usually by a laser diode or the like, and directed to impinge upon a bar code symbol disposed on a target a few inches from the front of the reader unit. The outgoing beam 151 is scanned in a scan pattern, and the user positions the hand-held unit so this scan pattern traverses the symbol to be read. Reflected and/or scattered light 152 from the symbol is detected by a light-responsive device 158 in the reader unit, producing serial electrical signals to be processed and decoded for reproducing the data represented by the bar code. As used hereinafter, the term "reflected light" shall mean reflected and/or scattered light.

In a preferred embodiment, the reader unit 100 is a gun shaped device having a pistol-grip type of handle 153. A movable trigger 154 is employed to allow the user to activate the light beam 151 and detector circuitry when the user has positioned the device to point at the symbol to be read. A lightweight plastic housing 155 contains the laser light source 146, the detector 158, the optics 157, 147, 159, and signal processing circuitry including a detector 17, and the CPU 140 as well as power source or battery 162. A light-transmissive window 156 in the front end of the housing 155 allows the outgoing light beam 151 to exit and the incoming reflected light 152 to enter. The reader 100 is designed to be aimed at a bar code symbol by the user from a position in which the reader 100 is spaced from the symbol, i.e., not touching the symbol or moving across the symbol. Typically, this type of hand-held bar code reader is specified to operate in the range of perhaps several inches.

The reader 100 may also function as a portable computer terminal, and include a keyboard 148 and a display 149, such as described in the previously noted U.S. Pat. No. 4,409,470.

As further depicted in FIG. 16, a suitable lens 157 (or multiple lens system) may be used to focus the scanned beam onto the bar code symbol at an appropriate reference plane. A light source 146 such as a semiconductor laser diode is positioned to introduce a light beam into the axis of the lens 157, and the beam passes through a partially silvered mirror 147 and other lenses or beam-shaping structure as needed, along with an oscillating mirror 159, which is attached to a scanning motor 160 activated when the trigger 154 is pulled. If the light produced by the source 146 is not visible, an aiming light, if needed, produces a visible-light spot which may be fixed, or scanned just like the laser beam; the user employs this visible light to aim the reader unit at the symbol before pulling the trigger 154.

Although the present invention has been described with respect to reading one or two dimensional bar codes, it is not limited to such embodiments, but may also be applicable to more complex indicia scanning applications. It is conceivable that the present invention may also find application for use with various machine vision or optical character recognition applications in which information is derived from other types of indicia such as characters or from the surface characteristics of the article being scanned.

In all of the various embodiments, the elements of the scanner may be assembled into a very compact package that allows the scanner to be fabricated as a single printed circuit board or integral module. Such a module can interchangeably be used as the laser scanning element for a variety of different types of data acquisition systems. For example, the module may be alternately used in a hand-held scanner, a table top scanner attached to a flexible arm or mounting extending over the surface of the table or attached to the underside of the table top, or mounted as a subcomponent or subassembly of a more sophisticated data acquisition system.

The module would advantageously comprise a laser-/optics subassembly mounted on a support, a scanning element such as a rotating or reciprocating mirror, and a photodetector component. Control of data lines associated with such components may be connected to an electrical connector mounted on the edge or external surface of the module to enable the module to be electrically connected to a mating connector associated with other elements of a data acquisition system.

An individual module may have specific scanning or decoding characteristics associated therewith, e.g., operability at a certain working distance, or operability with a specific symbology or printing density. The characteristics may also be defined through the manual setting of control switches associated with the module. The user may also adapt the data acquisition system to scan different types of articles or the system may be adapted for different applications by interchanging modules on the data acquisition system through the use of the simple electrical connector.

The scanning module described above may also be implemented within a self-contained data acquisition system including one or more such components as keyboard, display, printer, data storage, application software and data bases. Such a system may also include a communications interface to permit the data acquisition system to communicate with other components of a local area network or with the telephone exchange network, either through a modem or an ISDN interface, or by low power radio broadcast from the portable terminal to a stationary receiver.

While several embodiments and variations of the present invention for a piezoelectric beam deflector are described in detail herein, it should be apparent that the disclosure and teachings of the present invention will suggest many alternative designs to those skilled in the art.

What is claimed is:

1. A beam deflector for an optical system of a bar code scanner, comprising:
   a. said bar code scanner optical system having a focusing lens system with a relatively short focal length and an optical axis; and
   b. a piezoelectric bimorph element mounting said focusing lens system for movement substantially perpendicular to the optical axis of the focusing lens system, to produce a scanning of the bar code scanner optical system in a direction perpendicular to the optical axis, and a second piezoelectric bimorph element mounted on an opposite side of said focusing lens system from said first bimorph element, with the first and second bimorph elements being driven in-phase to produce a scanning of the bar code scanner optical system in a direction perpendicular to its optical axis.

2. A beam deflector for an optical system of a bar code scanner as claimed in claim 1, wherein said piezoelectric bimorph element is cantilever mounted, and the focusing lens system is mounted at the free end of the cantilever mounted piezoelectric bimorph element.

3. A beam deflector for an optical system of a bar code scanner as claimed in claim 1, wherein said second piezoelectric bimorph element is cantilever mounted, and the focusing lens system is mounted at the free end of the cantilever mounted second piezoelectric bimorph element.

4. A beam deflector for an optical system of a bar code scanner as claimed in claim 1, wherein said bar code scanner optical system includes a laser diode spaced along the optical axis of the focusing lens system.

5. A beam deflector for an optical system of a bar code scanner as claimed in claim 1, incorporated in a portable, hand-held bar code scanner.

6. A beam deflector for an optical system of a bar code scanner, comprising:
   a. said bar code scanner optical system comprising a focusing lens system with a relatively short focal length and an optical axis, a laser diode, and a limiting aperture spaced along the optical axis of the focusing lens system;
   b. a piezoelectric bimorph element mounting said laser diode for movement substantially perpendicular to the optical axis of said focusing lens system, to produce a scanning of the bar code scanner optical system in a direction perpendicular to the optical axis, and a second piezoelectric bimorph element mounted on said piezoelectric bimorph element, and said laser diode and said limiting aperture being mounted on said second piezoelectric bimorph element, such that the laser diode and limiting aperture are driven in combined x and y scanning motions by the combined motions of the piezoelectric bimorph elements.

7. A beam deflector for an optical system of a bar code scanner as claimed in claim 6, wherein said piezoelectric bimorph element is cantilever mounted, and the focusing lens system is mounted at the free end of the cantilever mounted piezoelectric bimorph element.

8. A beam deflector for an optical system of a bar code scanner as claimed in claim 6, said limiting aperture also being mounted on said piezoelectric bimorph element for movement with said laser diode.

9. A beam deflector for an optical system of a bar code scanner as claimed in claim 6, said focusing lens system comprising a positive lens and a negative lens.

10. A beam deflector for an optical system of a bar code scanner as claimed in claim 6, incorporated in a portable, hand-held bar code scanner.

11. A beam deflector for an optical system of a bar code scanner as claimed in claim 6, wherein said second piezoelectric bimorph element is cantilever mounted on said piezoelectric bimorph element, and the focusing lens system is mounted at the free end of the cantilever mounted second piezoelectric bimorph element.

12. A beam deflector for an optical system of a bar code scanner as claimed in claim 11, incorporated in a portable, hand-held bar code scanner.

13. A beam deflector for an optical system of a bar code scanner comprising a focusing lens system with a relatively short focal length and an optical axis, a first piezoelectric bimorph element mounted for scanning movement along a first axis, a second piezoelectric bimorph element mounted on said first piezoelectric bimorph element for scanning movement along a second axis substantially perpendicular to said first axis, and a scanning mirror means mounted on said second piezoelectric bimorph element, such that the scanning mirror means is driven in combined x and y scanning motions by the combined motions of the first and second piezoelectric bimorph elements.

14. A beam deflector for an optical system of a bar code scanner as claimed in claim 13, wherein said first piezoelectric bimorph element is cantilever mounted, and the second piezoelectric bimorph element is mounted at the free end of the cantilever mounted first piezoelectric bimorph element.

15. A beam deflector for an optical system of a bar code scanner as claimed in claim 14, wherein said second piezoelectric bimorph element is cantilever mounted on said first piezoelectric bimorph element, and the mirror means is mounted at the free end of the cantilever mounted second piezoelectric bimorph element.

16. A beam deflector for an optical system of a bar code scanner as claimed in claim 13, wherein said bar code scanner optical system includes a laser diode spaced along the optical axis of the focusing lens system.

17. A beam deflector for an optical system of a bar code scanner as claimed in claim 15, incorporated in a portable, hand-held bar code scanner.

18. A beam deflector for an optical system of a bar code scanner comprising a focusing lens system with a relatively short focal length and an optical axis, a first piezoelectric bimorph element mounting a first mirror means along the optical axis for scanning movement along a first axis, a second piezoelectric bimorph element mounting a second mirror means along the optical axis for scanning movement along a second axis substantially perpendicular to the first axis, such that a scanning beam is deflected in combined x and y scanning motions by the combined motions of the first and second mirror means.

19. A beam deflector for an optical system of a bar code scanner as claimed in claim 18, wherein said first piezoelectric bimorph element is cantilever mounted, and the first mirror means is mounted at the free end of the cantilever mounted first piezoelectric bimorph element.

20. A beam deflector for an optical system of a bar code scanner as claimed in claim 19, wherein said second piezoelectric bimorph element is cantilever mounted, and the second mirror means is mounted at the free end of the cantilever mounted second piezoelectric bimorph element.

21. A beam deflector for an optical system of a bar code scanner as claimed in claim 18, wherein said bar code scanner optical system includes a laser diode spaced along the optical axis of the focusing lens system.

22. A beam deflector for an optical system of a bar code scanner as claimed in claim 18, incorporated in a portable, hand-held bar code scanner.

23. A beam deflector for an optical system of a bar code scanner comprising a focusing lens system with a relatively short focal length and an optical axis, a first piezoelectric bimorph element mounted for scanning movement along a first axis, a second piezoelectric bimorph element mounted for scanning movement along a second axis substantially perpendicular to said first axis, and a scanning mirror means coupled to both said first and second piezoelectric bimorph elements, such that the scanning mirror means is driven in combined x and y scanning motions by the combined motions of the first and second piezoelectric bimorph elements.

24. A beam deflector for an optical system of a bar code scanner as claimed in claim 23, wherein said first piezoelectric bimorph element is cantilever mounted, and the scanning mirror means is mounted at the free end of the cantilever mounted first piezoelectric bimorph element.

25. A beam deflector for an optical system of a bar code scanner as claimed in claim 24, wherein said second piezoelectric bimorph element is cantilever mounted, and the scanning mirror means is mounted at the free end of the cantilever mounted second piezoelectric bimorph element.

26. A beam deflector for an optical system of a bar code scanner as claimed in claim 23, wherein said scanning mirror means is coupled directly to said first piezoelectric bimorph element, and is coupled by a thin bar to said second piezoelectric bimorph element.

27. A beam deflector for an optical system of a bar code scanner as claimed in claim 23, wherein said scanning mirror means is coupled to said first piezoelectric bimorph element by a first thin bar, and is coupled to said second piezoelectric bimorph element by a second thin bar.

28. A beam deflector for an optical system of a bar code scanner as claimed in claim 23, wherein said bar code scanner optical system includes a laser diode spaced along the optical axis of the focusing lens system.

29. A beam deflector for an optical system of a bar code scanner as claimed in claim 23, incorporated in a portable, hand-held bar code scanner.

30. A beam deflector for an optical system of a bar code scanner comprising a focusing lens system with a relatively short focal length and an optical axis, a cantilever mounted base holder drive comprising a permanent magnet and coil mounted to drive said cantilever mounted base holder drive for scanning movement of the holder drive along a first axis, and a piezoelectric bimorph element mounted on said base holder drive and mounting a scanning mirror means for scanning movement along a second axis substantially perpendicular to the first axis.

31. A beam deflector for an optical system of a bar code scanner as claimed in claim 30, wherein said piezoelectric bimorph element is cantilever mounted, and the scanning mirror means is mounted at a free end of the cantilever mounted piezoelectric bimorph element.

32. A beam deflector for an optical system of a bar code scanner as claimed in claim 31, wherein said piezoelectric bimorph element is cantilever mounted by a holder positioned substantially midlength of the piezoelectric bimorph element.

33. A beam deflector for an optical system of a bar code scanner, comprising:
   a. said bar code scanner optical system having a focusing lens system with a relatively short focal length and an optical axis; and
   b. a first piezoelectric bimorph element mounting said focusing lens system, and a second piezoelectric bimorph element mounted on an opposite side of said focusing lens system from said first bimorph element, with the first and second piezoelectric bimorph elements being driven out-of-phase to produce a zooming movement along the optical axis of the focusing lens system to produce a zoomed focusing of the bar code scanner optical system.

34. A beam deflector for an optical system of a bar code scanner as claimed in claim 33, wherein said first and second piezoelectric bimorph elements are cantilever mounted, and the focusing lens system is mounted at the free ends of the first and second cantilever mounted piezoelectric bimorph elements.

35. A beam deflector for an optical system of a bar code scanner as claimed in claim 34, wherein said bar code scanner optical system includes a laser diode spaced along the optical axis of the focusing lens system.

36. A beam deflector for an optical system of a bar code scanner as claimed in claim 34, incorporated in a portable, hand-held bar code scanner.

37. A beam deflector for an optical system of a bar code scanner comprising:
   a. said bar code scanner optical system having a focusing lens system with a relatively short focal length and an optical axis, a laser diode, and an adjustable limiting aperture spaced along the optical axis of the focusing lens system; and
   b. a piezoelectric bimorph element driving said adjustable limiting aperture to different aperture diameters, to produce a zoomed focusing of the bar code scanner optical system.

38. A beam deflector for an optical system of a bar code scanner as claimed in claim 37, wherein said piezoelectric bimorph element is cantilever mounted, and the adjusting limiting aperture is mounted at the free end of the cantilever mounted piezoelectric bimorph element.

39. A beam deflector for an optical system of a bar code scanner as claimed in claim 37, incorporated in a portable, hand-held bar code scanner.

40. A beam deflector for an optical system of a bar code scanner, comprising:

a. said bar code scanner optical system comprising a focusing lens system with a relatively short focal length and an optical axis, wherein said focusing lens system comprises a positive lens and a negative lens, a laser diode, and a limiting aperture spaced along the optical axis of the focusing lens system;

b. a piezoelectric bimorph element mounting said laser diode for movement substantially perpendicular to the optical axis of said focusing lens system, to produce a scanning of the bar code scanner optical system in a direction perpendicular to the optical axis.

* * * * *